S. STONE.
Self Loading and Dumping Cart.
No. 11,442.
3 Sheets—Sheet 1.
Patented Aug. 1, 1854.
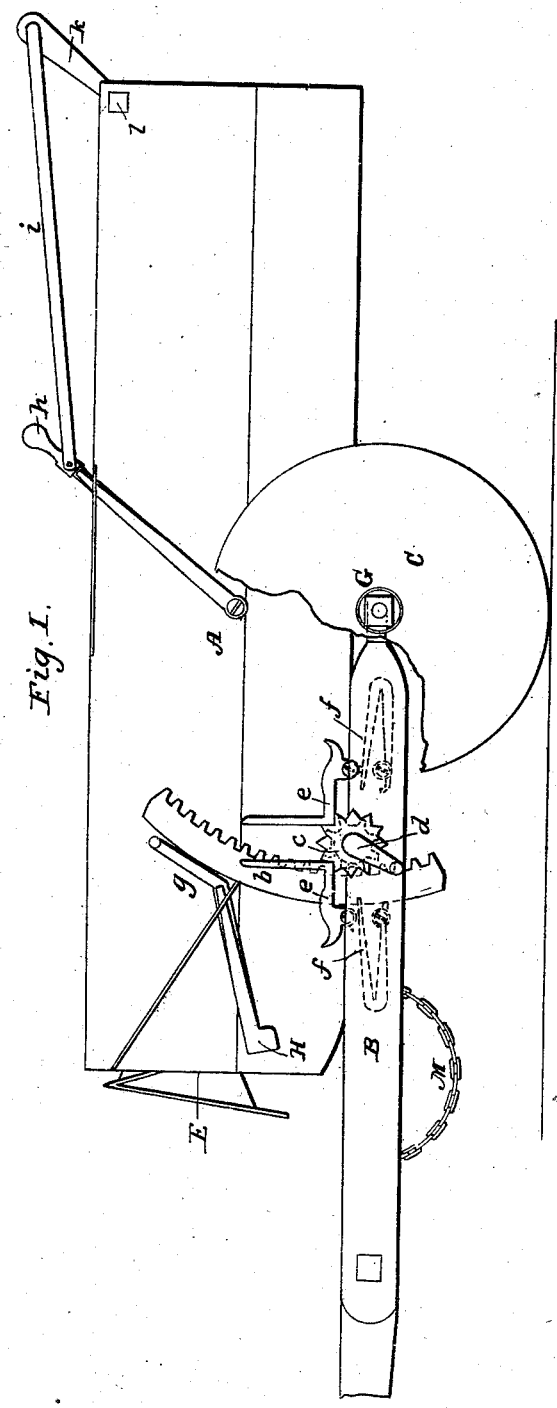
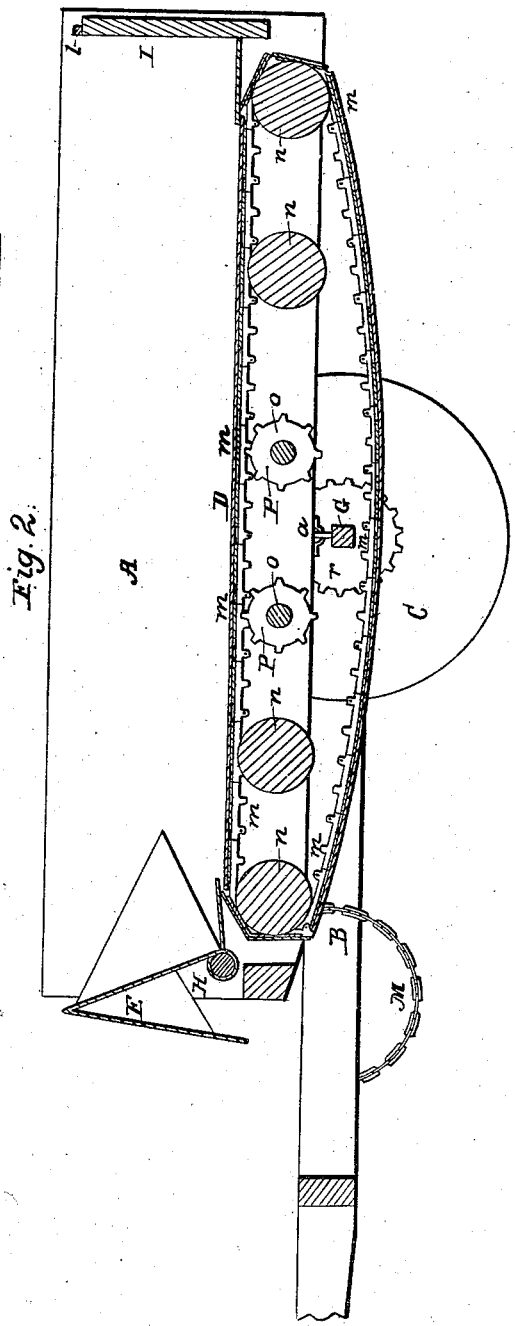

S. STONE.
Self Loading and Dumping Cart.
No. 11,442.
3 Sheets—Sheet 2.
Patented Aug. 1, 1854.
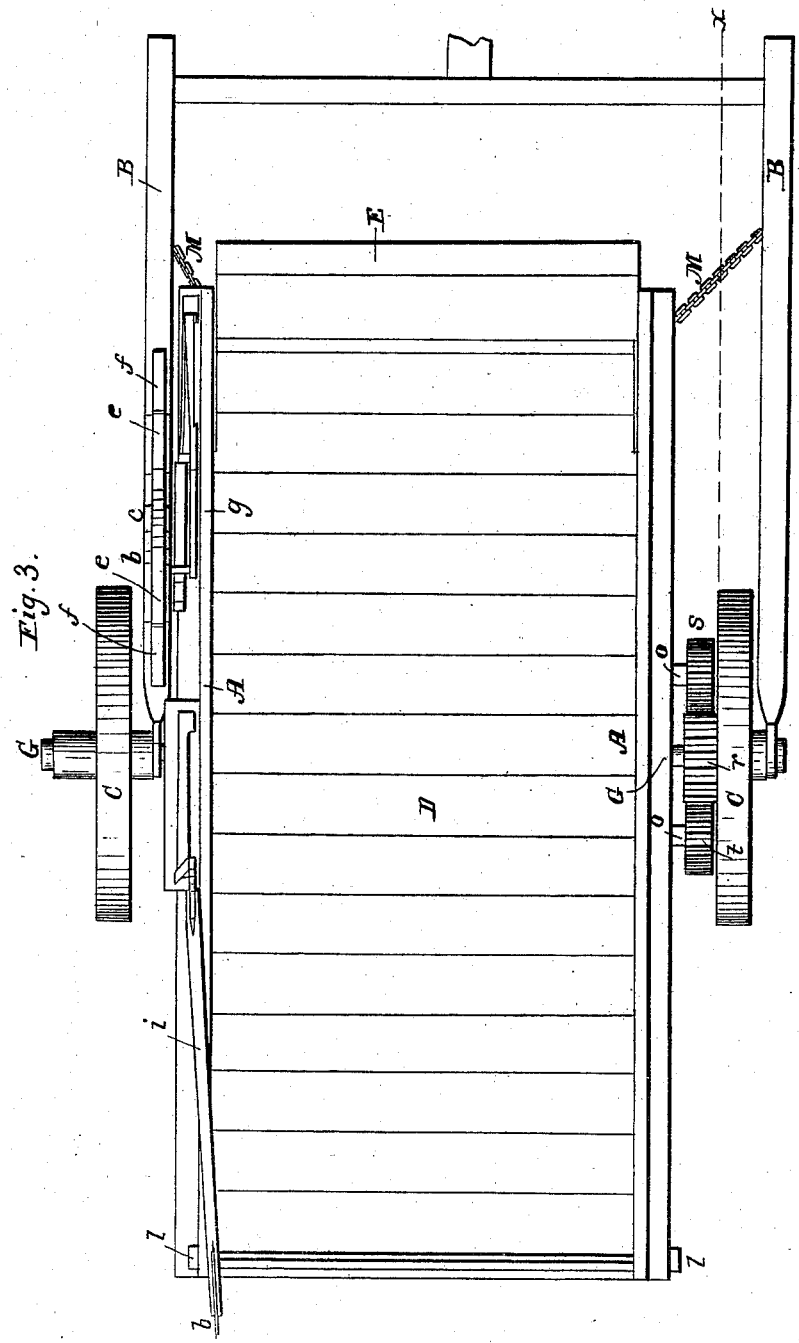

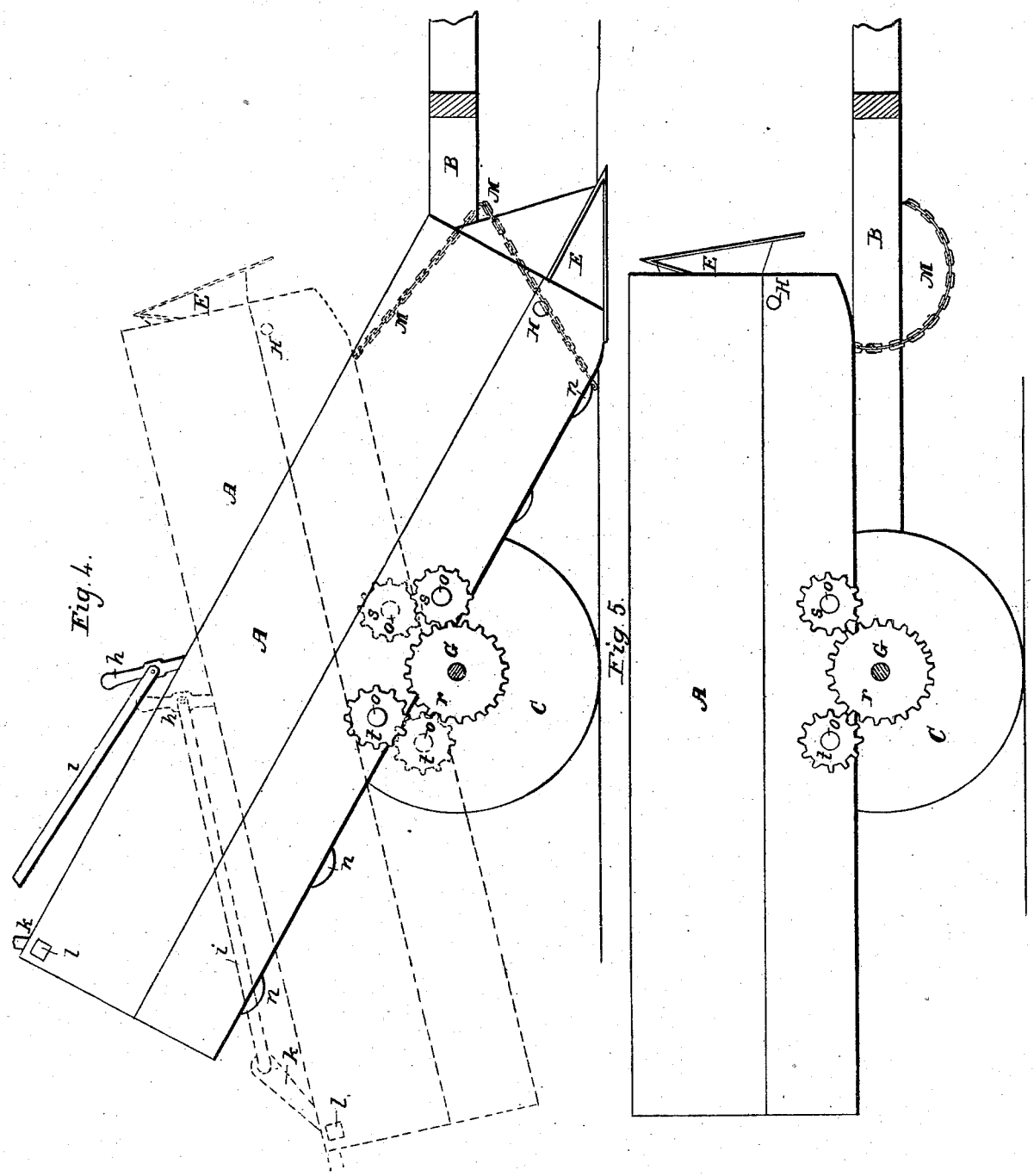

UNITED STATES PATENT OFFICE.

SANFORD STONE, OF KIRKERSVILLE, OHIO.

SELF LOADING AND DUMPING CART.

Specification of Letters Patent No. 11,442, dated August 1, 1854.

*To all whom it may concern:*

Be it known that I, SANFORD STONE, of Kirkersville, in the county of Licking and State of Ohio, have invented a new and Improved Self-Loading and Self-Dumping Cart; and I do hereby declare that the following is a full and exact description thereof, reference being had to the accompanying drawings, making part of this specification, Figure 1 being a side elevation of the cart; Fig. 2, a longitudinal vertical section thereof through the center; Fig. 3, a plan of the same; Fig. 4, a vertical section in the line $x\ x$ of Fig. 3, showing the respective positions of the cart-body and other parts when loading and dumping, and Fig. 5 a similar view showing the position of those parts when in the act of drawing the cart from place to place.

Like letters designate corresponding parts in all the figures.

The nature of my invention consists, first, in arranging the cart body with a scraper on its fore end and so as to tilt forward to the ground, for the purpose of scraping up the earth and loading itself, immediately from the ground, by its own action; secondly, in employing an endless, horizontal belt for and in the place of the bottom of the cart body, so arranged and operated by any suitable means that it will be made to revolve in the proper direction, during the time of loading and unloading the cart, but will not act, while drawing the cart from place to place, for the purpose of assisting the operations of loading and dumping; thirdly, in the combined arrangement of the cart body, with the fulcrum, or center, on which it tilts, at a suitable distance above the revolving axle of the cart, of a driving cog-wheel on said axle, and two pinions placed upon shafts by which the endless belt is driven, in such a manner that the forward pinion will play into said cog-wheel when the cart body is tilted forward for loading, and the hind pinion play therein when the cart is tilted backward for dumping, but when in a horizontal position neither pinion will be geared therewith, for the purpose of operating the endless belt when and only when required, substantially as hereinafter specified; fourthly, in the combination and arrangement of the rack on the cart body, the pinion on the draft frame playing therein, the ratchet wheel on the pinion shaft, and the two spring clicks acting on opposite sides of the ratchet wheel, in such a manner that the cart body may be tilted either way to any position and prevented from moving therefrom in either direction, substantially as hereinafter described.

The cart body A, is mounted upon a single pair of wheels C, C, and has its fulcrum, or center, $a$, on which it tilts, situated some distance above the center of the axle G, (as shown in Fig. 2,) sufficient for the purpose hereinafter set forth. The draft frame B, should be placed outside of the cart body, in order to allow it to be tilted forward without hinderance, and one side is most conveniently situated also outside of the adjacent wheel C, so as not to interfere with the cog-wheel $r$, and pinions $s$, $t$, as represented in Fig. 3.

The first main feature of my invention, is the arrangement of the cart body A, so that it may be tilted forward to the ground, together with the employment of a suitable scraper secured to its fore end, in order to enable the cart body itself to gather or scrape the earth immediately from the ground, and this requires both a convenient device for raising and lowering its forward end, and also the construction of said end so as to effectively scrape up and collect the earth. The first mentioned object I accomplish in the following manner:—A curved rack $b$, concentric with the fulcrum of the cart body, is secured to the side thereof, as represented. Into this rack plays a pinion, (shown by dotted lines at $c$, in Fig. 1), whose shaft is secured in proper bearings on the frame B, and is operated by means of a crank $d$, and on the same shaft is secured a ratchet wheel $c$, with teeth holding in both directions. In to this ratchet wheel two clicks $e$, $e$, situated on opposite sides thereof, play, so that one will hold the teeth in one direction and the other in the other direction. Said clicks are represented as being arranged in such a manner as to be retained either against the ratchet wheel or away from it, by means of springs $f$, $f$, as indicated in Fig. 1. When the cart body is to be tilted either way, the clicks are thrown back from the ratchet wheel and the handle $d$, turned till the action of the pinion in the rack brings the cart to the desired position. Then both clicks are returned to the ratchet wheel and thus hold the cart body immovably in that position. The second of the above mentioned objects is attained by securing, in the proper position, to the fore end of the cart body A, a scraper E, of any suitable form. In the drawings, said scraper is represented as vibrating on pivots H, H, so that it may be turned up in a vertical position, when not used in loading, and thus answer the additional purpose of an end board to the cart body; but when the cart is to be loaded, it is turned down into the position indicated by dark lines in Fig. 4. In this arrangement an arm $g$, attached to its pivot H, serves for operating it. But in practice I contemplate also making the scraper E, immovably attached to the cart body in the position last named, since it will hardly be necessary to provide for turning up the scraper, to confine the dirt within the cart body, while transporting it, because the forward portion of the cart will not be so full as to require it.

The second principal feature of my invention consists in the employment of an endless belt D, as the bottom of the cart body, on which the dirt rests, for the purpose of assisting in the loading and unloading of the cart, as follows:—It is constructed in any ordinary manner, but generally as represented, viz., of a series of wooden lags secured to two endless chains, which are composed of links provided with suitable projections, or depressions, $m$, $m$, &c., on their inner sides, for the purpose of gearing into rag-wheels $p$, $p$, on shafts $o$, $o$, whereby the endless belt is driven. Said shafts and their rag-wheels should be so operated as to respectively drive the endless belt in the direction indicated by the arrow in Fig. 2, when the cart is loading and unloading and cease to move it at all when the cart body is in a horizontal position, and the cart is moving from place to place, either loaded or empty, and when thus arranged the action of the endless belt will evidently tend to convey the dirt collected upon it back into the cart while loading and out again at the rear when unloading.

The tail-board I, is represented as being hinged on pivots $l$, $l$, at its upper edge, to the sides of the cart body, and managed by means of arms $i$, $k$, and a lever $h$, so that it can be turned up out of the way, before dumping the load, and afterward returned to its vertical position.

The remaining feature of my invention consists in the arrangement for operating the endless belt D, in the manner described above, by means of the axle G, in the act of drawing the cart forward. For this purpose, said axle is arranged so as to turn with the carriage wheels C, C, and has upon it a cog-wheel $r$, of suitable size, at one side of the cart body. Upon the ends of the cog-wheel shafts $o$, $o$, are secured two pinions $s$, and $t$, of such size and so situated that neither will take into the cog-wheel $r$, when the cart body is in a horizontal position; but that when the cart body is tilted forward to the position, for loading, the pinion $s$, will become geared into said cog-wheel, in front, as shown by dark lines in Fig. 4, and thus be caused to revolve as the cart moves forward to scrape up the earth, whereby the endless belt is, during that time, set in motion; and when the cart body is tilted backward for dumping, the pinion $t$, will in like manner be geared into said cog-wheel, in the rear, as shown by red lines in Fig. 4, and be caused to revolve as the cart moves forward, and thus, by operating the endless belt, assist in expelling the earth from the cart. The distance of the fulcrum $a$, of the cart body above the axle G, should be such as to bring said pinions alternately into and out of gear, in the above described manner.

In order to prevent injury to any part by forcing the cart body against the ground in the act of loading, chains M, M, (or their equivalents,) are attached to the draft frame and cart body, as represented, which are of such a length that they will be straightened, and sustain the resistance of the earth when the scraper is lowered to the desired depth into the ground; and for the purpose of permitting different depths to which the scraper may enter the earth, said chains may be made adjustable in length.

My improved cart, as above described, is perfectly effectual in its operation, and possesses all the compactness of an ordinary cart so that it can be conveniently employed in grading rail roads, where ordinary self-loading carts cannot be used.

Having thus fully described my improved self-loading and self-dumping cart, what I claim therein as new and desire to secure by Letters Patent is,

1. Arranging the cart body with a scraper on its fore end, and so as to tilt forward to the ground, for the purpose of scraping up the earth and loading itself immediately from the ground, by its own action.

2. I also claim the employment of an endless, horizontal belt for, and in the place of, the bottom of the cart body, so arranged and operated, by any suitable means, that it will be made to revolve in the proper direction, during the time of loading and unloading the cart, but will not act, while drawing the cart from place to place; for the purpose of assisting the operations of loading and dumping, substantially as herein set forth.

3. I also claim the combined arrangement of the cart body, with the fulcrum, or center, on which it tilts, (at a suitable distance above the revolving axle of the cart,) the driving cog-wheel on said axle, and two pinions placed upon the shaft by which the endless belt is driven, in such a manner that the forward pinion will play into said cogwheel when the cart body is tilted forward for loading, and the hind pinion play therein when the cart is tilted backward for dumping, but when in a horizontal position neither pinion will be geared therewith; for the purpose of operating the endless belt when, and only when required, substantially as herein specified.

4. I also claim the combination and arrangement of the rack on the cart body, the pinion on the draft frame, playing therein, the ratchet wheel on the pinion shaft, and the two clicks, on opposite sides of the ratchet wheel, in such a manner that the cart body may be tilted to any position and immovably held there, substantially as described.

The above specification of my new and improved self-loading and self-dumping cart signed by me this fourth day of March, 1854.

SANFORD STONE.

Witnesses:
Z. C. ROBBINS,
J. S. BROWN.